(12) United States Patent
Whelan

(10) Patent No.: US 11,507,610 B2
(45) Date of Patent: Nov. 22, 2022

(54) METHODS FOR DETERMINING A COMPARATIVE VALUATION FOR AN ASSET

(71) Applicant: The Boeing Company, Chicago, IL (US)

(72) Inventor: John Desmond Whelan, Burien, WA (US)

(73) Assignee: THE BOEING COMPANY, Chicago, IL (US)

( * ) Notice: Subject to any disclaimer, the term of this patent is extended or adjusted under 35 U.S.C. 154(b) by 380 days.

(21) Appl. No.: 16/681,532

(22) Filed: Nov. 12, 2019

(65) Prior Publication Data

US 2021/0141816 A1   May 13, 2021

(51) Int. Cl.
    *G06F 16/335*  (2019.01)
    *G06F 16/28*   (2019.01)
    *G06F 16/2458* (2019.01)
    *G06F 40/205*  (2020.01)

(52) U.S. Cl.
    CPC ........ *G06F 16/335* (2019.01); *G06F 16/2458* (2019.01); *G06F 16/289* (2019.01); *G06F 40/205* (2020.01)

(58) Field of Classification Search
    CPC .. G06F 16/335; G06F 16/2458; G06F 16/289; G06F 40/205; G06F 16/28
    USPC ........................................................ 707/722
    See application file for complete search history.

(56) References Cited

U.S. PATENT DOCUMENTS

| 8,255,309 | B2 * | 8/2012 | Kasravi | G06Q 10/10 |
|           |      |        |         | 705/36 R |
| 10,346,793 | B2 * | 7/2019 | Agarwal | G06Q 10/087 |
| 2006/0015425 | A1 * | 1/2006 | Brooks | G06Q 40/10 |
|           |      |        |         | 705/35 |
| 2012/0143782 | A1 * | 6/2012 | Bonner | G06Q 30/02 |
|           |      |        |         | 705/36 R |
| 2013/0073439 | A1 * | 3/2013 | Porwal | G06Q 40/06 |
|           |      |        |         | 705/30 |
| 2014/0279151 | A1 * | 9/2014 | Seid | G06Q 30/06 |
|           |      |        |         | 705/26.3 |

(Continued)

FOREIGN PATENT DOCUMENTS

CN   104937630 A *  9/2015 ............ G06Q 30/00

*Primary Examiner* — Giovanna B Colan
(74) *Attorney, Agent, or Firm* — Alleman Hall Creasman & Tuttle LLP

(57) ABSTRACT

A method includes determining a comparative valuation for an asset including one or more objects. Specification data for the asset is retrieved, and comparable objects including two or more attributes are generated. Each attribute includes an attribute category and an associated attribute value. Comparison weights are received for attribute categories, and analogous object data is retrieved for analogous objects that are each analogous to the comparable object. The analogous object data includes attributes that are each analogous to one of the attributes of the comparable object. Each analogous attribute includes a category, a value, and a valuation. A comparative valuation for the object is output based on the associated attribute values for the comparable object, the associated analogous attribute values for each analogous object, the valuation of each analogous object, and the comparison weights. The comparative valuation for the asset is output based on the comparative valuations for each object.

14 Claims, 7 Drawing Sheets

(56) References Cited

U.S. PATENT DOCUMENTS

2015/0254612 A1* 9/2015 Mills .................. G06Q 40/06
705/7.15

* cited by examiner

| COMPARABLE OBJECT 420 | | | | RADIUS 430 |
|---|---|---|---|---|
| ATTRIBUTE CATEGORIES 425 | COMPARISON WEIGHTS 410 | | | |
| | LOW | MED | HIGH | |
| material | ☐ | ☐ | ☐ | |
| location | ☐ | ☒ | ☒ | ▶ 0.05 |
| height | ☐ | ☐ | ☒ | ▶ 0.15 |
| weight | ☐ | ☒ | ☐ | ▶ 0.00 |
| size | ☐ | ☐ | ☐ | ▶ 0.05 |
| width | ☐ | ☐ | ☐ | |
| configuration | ☒ | ☐ | ☒ | |
| color | ☐ | ☐ | ☐ | |
| . | | | | |
| . | | | | |
| . | | | | |

COMPARABLE OBJECT 510

| ATTRIBUTES 515 | |
|---|---|
| ATTRIBUTE CATEGORIES 522 | ASSOCIATED ATTRIBUTE VALUE 524 |
| material | aluminum |
| by-wire | true |
| height | 64 ft |
| weight | 90,000 lbs |
| capacity | 480 |
| width | 225 ft |
| year | 2012 |
| color | white |
| . | . |
| . | . |
| . | . |

ANALOGOUS OBJECTS 520

| OBJECT 532 | SIMILARITY SCORE 530 | MATCHING ATTRIBUTES 540 |
|---|---|---|
| 1420 | 1.00 | Material, height, weight, width, capacity, year |
| 2574 | 0.91 | Material, height, weight, width, year, color |
| 111 | 0.87 | Material, height, weight, width, year, color |
| 529 | 0.71 | Material, by-wire, weight, width, capacity |
| 811 | 0.71 | Material, by-wire, weight, width, capacity |
| 8969 | 0.71 | Material, by-wire, weight, width, capacity |
| 236 | 0.70 | height, weight, width, capacity, year |
| 87 | 0.68 | height, weight, width, capacity, color |
| . | . | . |
| . | . | . |
| . | . | . |

FIG. 5

| ANALOGOUS OBJECTS 620 | | | |
|---|---|---|---|
| SIMILARITY SCORE 635 | OBJECT 610 | VALUATION 640 | COMMON ATTRIBUTES 630 |
| 1.00 | 1420 | $200M | Material, height, weight, width, capacity, year |
| 0.91 | 2574 | $230M | Material, height, weight, width, year, color |
| 0.87 | 111 | $187M | Material, height, weight, width, year, color |
| 0.71 | 529 | $315M | Material, by-wire, weight, width, capacity |
| 0.71 | 811 | $220M | Material, by-wire, weight, width, capacity |
| 0.71 | 8969 | $179M | Material, by-wire, weight, width, capacity |
| 0.70 | 236 | $199M | height, weight, width, capacity, year |
| 0.68 | 87 | $267M | height, weight, width, capacity, color |
| . | . | . | |
| . | . | . | |
| $w_n$ | | $v_n$ | |

COMPARATIVE $VALUATION$ 605

METHODS FOR DETERMINING A COMPARATIVE VALUATION FOR AN ASSET

FIELD

This invention relates to determining and influencing a valuation for an asset. In some example implementations, the invention is particularly useful for determining a valuation for large assets which include multiple objects.

BACKGROUND

Both individuals and companies may at times need to evaluate the value of their held assets. As an example, an aerospace company may acquire a significant fleet of used airplanes. These acquired planes may sit for months or longer while waiting to be purchased, deployed or otherwise transitioned. During this time, the company may have to record and report the value of these acquired assets to various third parties. For example, a value (e.g., in dollars) may have to be generated for the asset in order to satisfy government and shareholder interests.

Obtaining the value of such assets is not necessarily straightforward. If the company holds on to an airplane for a significant time, the plane's value typically would decrease. On the other hand, vintage airplanes could become more valuable over time, if the demand for them increases. As such, the sales price for the asset may not necessarily reflect the true value of the asset. Further, it may be challenging to find comparable values for the asset on the open market. A large asset, such as a fleet of airplanes, may not have direct comparisons on the open market, as fleets currently for sale or recently sold fleets may contain a different number of airplanes, airplanes of different types, model years, interior designs, etc. This may leave the owner or potential purchaser of the asset at the mercy of valuation experts affiliated with other parties that do not necessarily have common interests in generating the comparative valuation of the asset.

SUMMARY

To address the above issues, according to one aspect of the present disclosure, a method for determining a comparative valuation for an asset including one or more objects is provided herein. In this aspect, the method includes retrieving specification data for the asset. For each object of the asset, a comparable object is generated based on the retrieved specification data, the comparable object including two or more attributes, each attribute defined by an attribute category and an associated attribute value. Comparison weights are received for at least some of the attribute categories. Based at least in part on the received comparison weights, analogous object data is retrieved for a plurality of analogous objects that are each analogous to the comparable object. The analogous object data for each analogous object includes two or more analogous attributes that are each analogous to one of the attributes of the comparable object, each analogous attribute defined by an analogous attribute category and an associated analogous attribute value, and a valuation of the analogous object. A comparative valuation for the object is output based on at least the associated attribute values for the comparable object, the associated analogous attribute values for each analogous object, the valuation of each analogous object, and the received comparison weights. The comparative valuation for the asset is output based on the comparative valuations for each object of the asset.

Another aspect of the present disclosure relates to a computing device configured to determine a comparative valuation for an asset including one or more objects. The computing device includes a logic processor and a non-volatile storage device configured with instructions that, when executed, cause the logic processor to retrieve specification data for the asset. For each object of the asset, a comparable object is generated based on the retrieved specification data, the comparable object including two or more attributes, each attribute defined by an attribute category and an associated attribute value. Comparison weights are received for at least some of the attribute categories. Based at least in part on the received comparison weights, analogous object data is retrieved for a plurality of analogous objects that are each analogous to the comparable object. The analogous object data for each analogous object includes two or more analogous attributes that are each analogous to one of the attributes of the comparable object, each analogous attribute defined by an analogous attribute category and an associated analogous attribute value, and a valuation of the analogous object. A comparative valuation for the object is output based on at least the associated attribute values for the comparable object, the associated analogous attribute values for each analogous object, the valuation of each analogous object, and the received comparison weights. The comparative valuation for the asset is output based on the comparative valuations for each object of the asset.

Yet another aspect of the present disclosure relates to a method for determining a comparative valuation for an object. In this aspect, the method includes retrieving specification data for the object. A comparable object is generated based on the retrieved specification data, the comparable object including two or more attributes, each attribute defined by an attribute category and an associated attribute value. A first set of comparison weights is received for at least some of the attribute categories. Based at least in part on the first received set of comparison weights, a first set of analogous object data is retrieved for a first set of analogous objects that are each analogous to the comparable object. The first set of analogous object data includes two or more analogous attributes that are each analogous to one of the attributes of the comparable object, each analogous attribute defined by an analogous attribute category and an associated analogous attribute value, and a valuation of each analogous object. A first comparative valuation for the object is output based on at least the associated attribute values for the comparable object, the first set of associated analogous object data, the valuation of each analogous object, and the first received set of comparison weights. A second set of comparison weights is received for at least some of the attribute categories. Based at least in part on the second received set of comparison weights, a second set of analogous object data is retrieved for a second set of analogous objects that are each analogous to the comparable object. The second set of analogous object data includes two or more analogous attributes that are each analogous to one of the attributes of the comparable object, each analogous attribute defined by an analogous attribute category and an associated analogous attribute value, and a valuation of each analogous object. A second comparative valuation for the object is output based on at least the associated attribute values for the comparable object, the second set of associated analogous object data, the valuation of each analogous object, and the second set of comparison weights.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIG. 4 shows an example interface for adjusting comparison weights for a comparable object, the comparison weights being usable to influence object valuations.

FIG. 5 shows an example table depicting an attribute association comparison.

FIG. 6 shows an example interface for determining a comparative valuation for an object.

DETAILED DESCRIPTION

Figure 1:
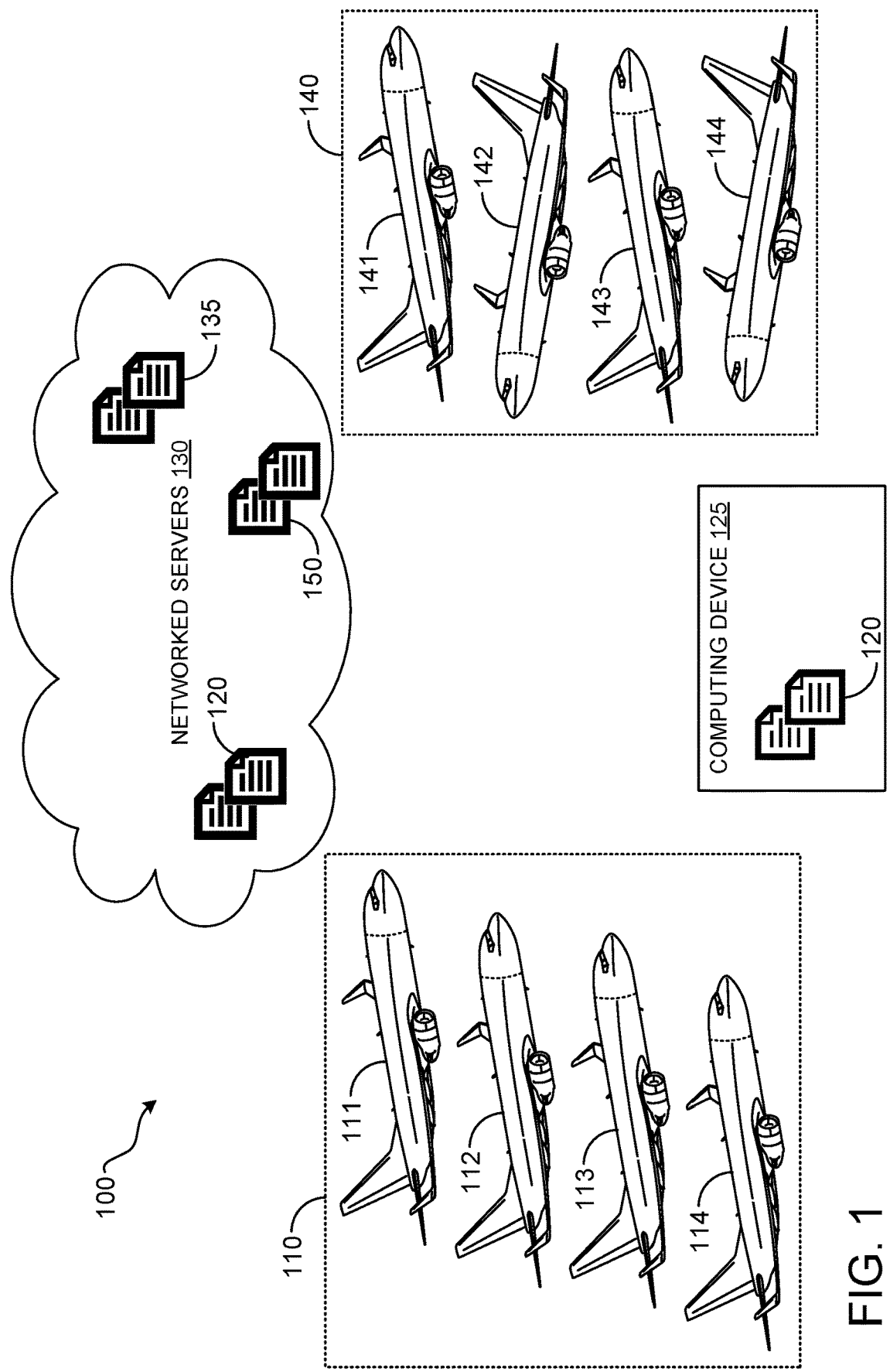
FIG. 1 depicts an example system 100 for valuating large assets.

Generating a comparative value for a large asset may be challenging, particularly if the asset is unique, customized, or comprised of numerous, non-identical objects. Additionally, it is often necessary to provide an official "paper trail" detailing the process by which the comparative valuation was derived. In addition to ensuring accuracy and correctness, this kind of documentation may be required in order to satisfy both government and stakeholder interests concerning general audits and regulatory inspections.

When one buys or sells an asset, the sale price of that asset typically defines its value. However, this value only truly applies during the sale. Once the sale is complete, the value of the asset can change, especially over time. This is also true with regard to previous assessments and appraisals. Additionally, a final sale price does not necessary reflect the true value of an asset on the open market at the time of sale. For example, the exchange of the asset could be integrated into a swap of assets, including tangible objects, debt, stock, property, etc.

A variety of methods have been used in an attempt to solve the problem of accurate valuation. As an example, local appraisal specialists may evaluate an asset using experience and local resources to derive an appropriate value. This method assumes that a suitable specialist and/or resources exist to properly evaluate the asset. For large, unique assets, there may a limited number of specialists capable of performing such a valuation. Online appraisal tools may be available for a variety of large assets. These tools tend to be somewhat generalized and may not provide an accurate evaluation on uncommon or singular assets. Both specialists and online tools tend to rely heavily on comparisons with similar assets. The results thus rely heavily on what comparisons are made and the level of accuracy and validity to those comparisons.

Further, the valuations generated by specialists and online tools are not necessarily produced with the best interests of the asset owner (or seeker). In many cases the end-user would benefit from having more influence over the value of the asset. For example, when selling an asset, the user may want to increase the asset's value or provide a "high" estimate that is grounded in the values of similar assets. When assessing value for income purposes, the user may want to decrease the asset's value.

However, particularly for large assets, or for object with numerous attributes, it may be difficult to find exact analogous matches. This is particularly true for assets with intangible qualities that nevertheless influence the value of the asset. To determine valuation of an object having numerous attributes, it may be necessary to perform comparisons against objects that are roughly equivalent, but that only have some attributes in common. It may thus be beneficial in these circumstances to focus the comparison on certain attributes of the object, thereby producing a more predictable outcome. This may allow a user to influence the valuation for particular purposes, to receive a range of valuations for an asset, and/or to capture the value of non-tangible attributes of an asset. There thus exists a demand for a solution which dynamically ties all the available information on a particular asset together and derives a value from this information.

Herein, systems and methods are described that create comparable objects from the specification data of a (large) asset. Attribute Association may be used to transform the specifications into comparable objects which may then be compared with other analogous objects. This may be done by matching their respective attribute categories and then comparing their values. Moreover, each attribute category of the comparable object may be given a comparison weight to strengthen or weaken its association with analogous objects. The comparative valuations of the resulting analogous objects may then be used to derive a comparative valuation of the asset and each object thereof. By adjusting the comparison weights, the user may influence the subsequent comparisons by increasing or decreasing the importance of an attribute category, thus generating comparisons that have a stronger correlation to a desired outcome.

These systems and methods enable a more fluent and non-static approach to asset valuation when compared with traditional methods. This includes considering of non-traditional factors, including abstract or non-tangible characteristics, such as safety or security concerns, when generating a valuation for a particular asset. Valuation may be performed in real-time in a language independent manner. A weighting mechanism may allow users to drive the comparison across a range of analogous, but not necessarily identical, objects.

Moreover, these systems and methods provide end-users with a voice in the valuation process. This may include emphasizing aspects of the asset that are overlooked or intangible, and/or addressing situations when an alternate valuation focuses too heavily on certain aspects of the asset. In particular, this may provide a remedy to situations where an asset or object appears to be significantly undervalued or overvalued. The systems and methods herein may generate a valuation and/or a range of valuations along with a paper trail that provides evidence for the validity of the valuation. This may allow for non-experts to support or contest an initial assessment generated by an outside party. Such influence over the valuation is especially helpful to a user when dealing with hard-to-value assets, e.g., those having qualities that are intangible, yet valuable.

FIG. 1 depicts an example system 100 for valuating large assets, such as large asset 110, depicted as a fleet of airplanes (111, 112, 113, and 114). However, large assets may include numerous embodiments, such as buildings, physical assets, offshore development groups, subsidiary companies, etc. and any group or combination thereof. Further, while described in the context of "large" assets, the systems and methods described herein are not limited to such examples and may be equally applied to valuating any asset having multiple describable attributes.

Each of airplanes 111-114 may be considered an object of large asset 110. Specification data 120 for each object may be retrieved by computing device 125. Specification data may include any relevant information pertaining to an object, such as original specifications, service records, repair records, use logs, on-board records, etc. Such specification data may reside locally at computing device 125 or may be accessed from a cloud and/or networked servers 130.

Each object may be considered an instantiation of an object type. For example, an object type may be "airplane", while airplanes 111-114 may be considered individual objects. In some examples, an object may be intangible or abstract, such as a passenger's travel habits. The object types may be used to define attributes within the specification data.

Each object contains a set of attributes used to describe it. Attributes may use a category and a corresponding value to define aspects of an object. Each attribute value can be either numeric or non-numeric. Large assets incorporate many specific attributes which can influence their value.

Some of these attributes may be non-tangible and/or may not be quantifiable. For example, a particular airplane could include what is considered to be a safer staircase that is exclusive to the production of that airplane. As a result, it can be difficult for a system to calculate the exact value this staircase adds to the plane's overall valuation. Such circumstances cause systems to fail or severely slow down as a result of circular logic incorporated to offset the nebulous structure of this kind of information. As such, it is challenging to determine a comparative value for a unique object, much less a large asset including many unique objects and one or more unquantifiable characteristics.

Specification data 135 for a plurality 140 of analogous objects (airplanes 141, 142, 143, and 144) may be retrieved by computing device 125. Attributes may be extracted from specification data 135. In this way, the specification data may be mapped to each object, regardless of their structure (or lack thereof). The attributes may then be used to form the basis for a comparison for each airplane 111-114. The resulting valuations may be used to determine an overall valuation for large asset 110.

In some examples, historical data 150 may also be retrieved and/or accessed by computing device 125 from a cloud and/or networked servers 130. Historical data 150 may include valuations and specification data for objects over time, including current objects, decommissioned objects, and other analogous objects. Historical data 150 may be used to add context to specification data and valuations for both objects of the large asset and analogous objects, including, for example, how sale prices and valuations fluctuate over time, how sale prices and valuations are impacted by current supply and demand, emerging technology, interest rates, etc.

Figure 2:
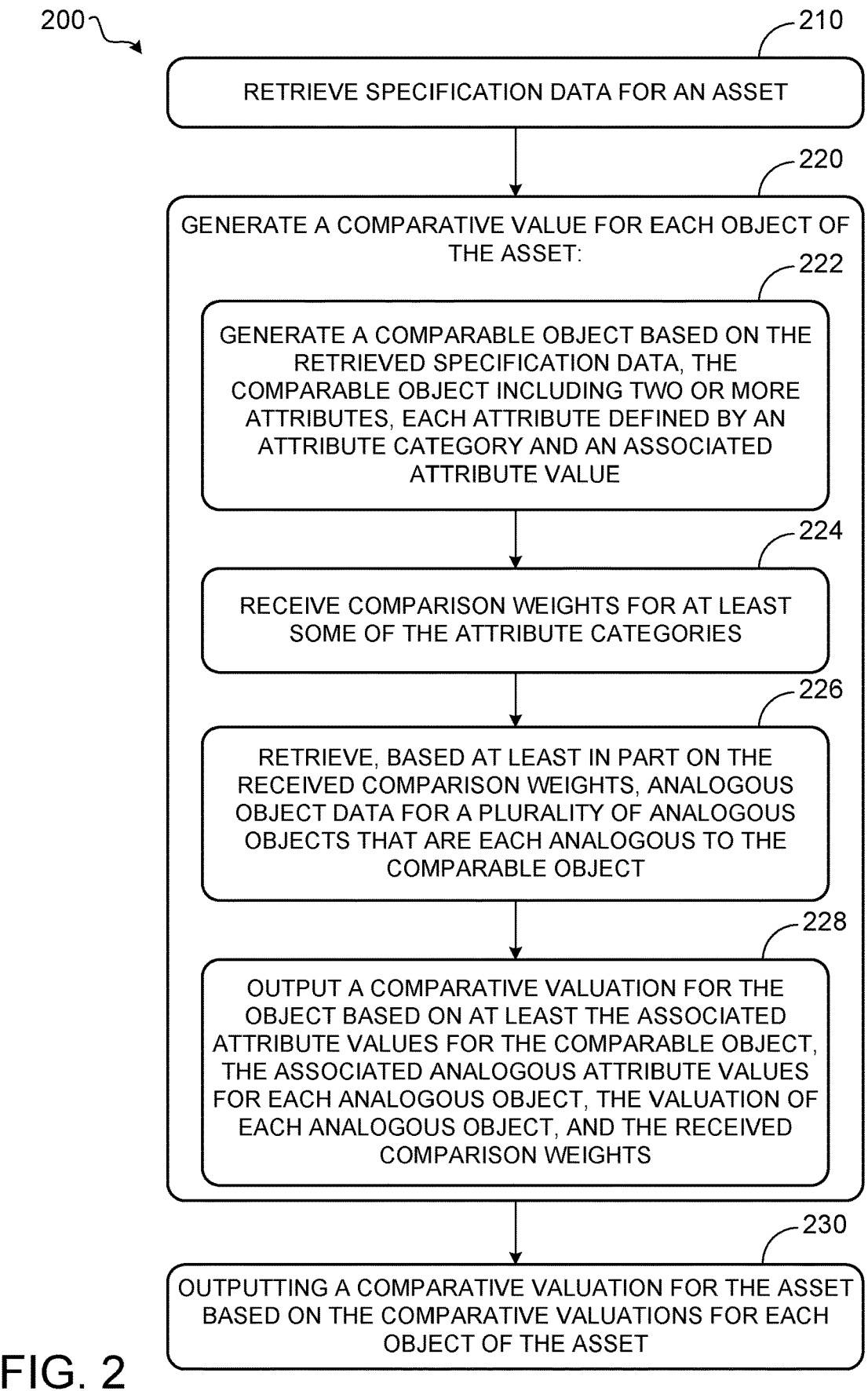
FIG. 2 shows an example method for determining a comparative valuation for an asset including one or more objects.

FIG. 2 shows a flow chart for an example method 200 for determining a comparative valuation for an asset including one or more objects. At 210, method 200 includes retrieving specification data for the asset. As shown in FIG. 1, specification data for an asset may be locally loaded onto a computing device, retrieved and/or accessed from a cloud computing device, etc.

At 220, method 200 includes generating a comparative value for each object of the asset. At 222, method 200 includes, for each object of the asset, generating a comparable object based on the retrieved specification data, the comparable object including two or more attributes, each attribute defined by an attribute category and an associated attribute value. In order to generate an accurate valuation, a system may generate comparable objects from the specification data for each object of the asset.

Figure 3:
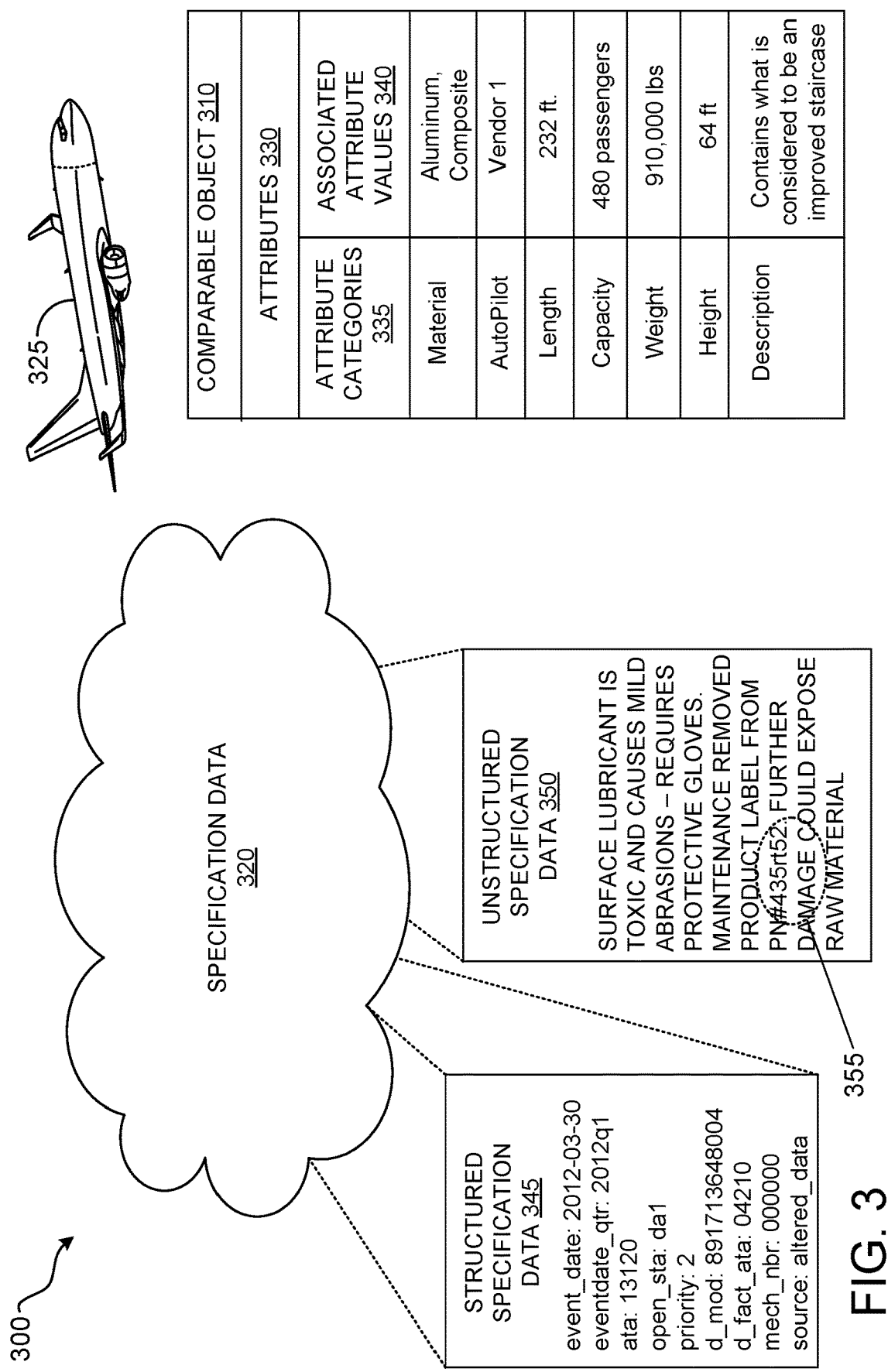
FIG. 3 shows an example workflow for generating a comparable object from specification data for an object of an asset.

As an example, Attribute Association may be used to generate comparable objects based on object records found in the specification data. FIG. 3 shows an example workflow 300 for generating a comparable object 310 from specification data 320 for an object 325 of an asset. Specification data 320 may be derived from one or more databases or files. Each object 325 may be described by a plurality of attributes 330. Each attribute may include an attribute category 335 (e.g., length) and an associated attribute value 340 (e.g., 76 m). Attributes 330 serve to create a comparable description of each object.

Specification data 320 may include both structured specification data 345 and unstructured specification data 350. In some examples, both structured specification data 345 and unstructured specification data 350 may be retrieved from the same file or record, such as textual notes appended to a spreadsheet. The resulting attributes may be abstracted so that each type of data is given equal weight during subsequent analysis and comparison.

Structured specification data 345 may include columns and values there within may be directly translated into categories and associated attribute values for an attribute. Column names and XML tags may be used to identify structured data. In some examples, the categories may be mapped to a predetermined list of comparative category names, such that similar attributes can be directly compared. Similarly, for quantifiable values, standardized units may be applied so that all associated attribute values for a category use the same units (e.g., metric units).

Unstructured specification data 350 may include free-flowing text, sentences, paragraphs, or other data without predefined structure. One or more parsers and/or extractors may be used to define and derive data from unstructured specification data 350. As such, generating comparable object 310 may include extracting two or more attributes from unstructured specification data. The extracted attributes may include associated attribute values 340 and/or attribute categories 335. In some examples, an attribute category may be given a predetermined label or a syntax label such as a noun, verb, adjective or adverb derived from unstructured specification data 350. Associated attribute values 340 may be identified by parsing text-based passages.

As an example, an extractor may be applied to unstructured specification data 350 using the pattern PN #[A-Za-z0-9] to obtain the part number 435rt52 from the second sentence captured at 355. As a result, this may automatically associate that part number 435rt52 with a particular product, even though it is not structurally bonded in the data.

Associated attribute values 340 derived from either structured specification data 345 or unstructured specification data 350 may include both quantifiable values and non-quantifiable values. Similarly, both tangible and intangible data may be derived from either structured specification data 345 or unstructured specification data 350, though intangible data may be more commonly found in unstructured specification data 350.

Returning to FIG. 2, at 224, method 200 includes, for each object, receiving comparison weights for at least some of the attribute categories. The comparison weights allow for a user or computing system to change the relative weights of each attribute category in order to influence which analogous objects are compared to the comparable object in determining a valuation. This may be done to drive a desired outcome of valuation, to expand or contract the pool of analogous objects used for comparison, to generate a range of valuations, to determine a valuation for different purposes, etc. For example, if an airplane was being sold for scrap metal, attribute categories of weight and body composition may be given a greater comparison weight than that for an auto-pilot OS that is installed or for a current seating configuration. If the same airplane were being evaluated for sale to a start-up airline, these comparison weights may be reversed.

FIG. 4 shows an example interface 400 for adjusting comparison weights 410 for a comparable object 420. The comparison weights 410 may be received for one or more attribute categories 425 which relate to comparable object 420. Each attribute category 425 may be given a weight which has the ability to strengthen or weaken its association, thereby giving the value associated with the weighted attribute category more or less importance as it pertains to the overall comparison.

In this case, the available comparison weights include five levels between Low, Medium, and High, but in other examples, the comparison weights may be applied more granularly, over a continuous scale, as a simple yes/no, etc. Attribute categories 425 weighted towards the lower end (or not weighted at all) have lesser importance with concerns to the eventual comparison. Conversely, attribute categories weighted towards the higher end have greater importance.

These weights allow users to fine-tune their associations in order to obtain relevant comparative results and/or to influence the valuation of large assets by weighting characteristics which have a stronger correlation to a desired outcome. For instance, to increase an asset's valuation, high-end specialized characteristics may be weighted more heavily in order to bring out an asset's premium value. On the other hand, to lower the valuation, generic characteristics more could be weighted more, such as aspects which are shared with lower-valued objects.

In addition to comparison weights 410, attribute categories 425 having quantifiable attribute categories may include one or more radii 430 of attribute values. Such radii permit the corresponding attribute category value to match within a certain percentage and/or absolute value, thus allowing for more associations. For example, a 76 m airplane could be given a 5 m radius, allowing all airplanes with lengths between 71 m and 81 m to fit the comparison criteria.

Returning to FIG. 2, at 226 method 200 includes retrieving, based at least in part on the received comparison weights, analogous object data for a plurality of analogous objects that are each analogous to the comparable object. The analogous object data for each analogous object may include two or more analogous attributes that are each analogous to one of the attributes of the comparable object, each analogous attribute defined by an analogous attribute category and an associated analogous attribute value. The analogous object data may further include a valuation of the analogous object.

Analogous object data may be retrieved from a plurality of sources, including cloud and/or networked drives. A database of analogous object data may be stored, either locally or remotely, and updated periodically, so that there is no need to search for and parse all relevant object data each time a comparison is desired. As described with regard to FIG. 1, analogous object data may include specification data for specific objects as well as historical data. In parsing large amounts of data, e.g., from a cloud source, the data may be divided into perspectives and domains. A domain may be "air travel", for example, while relevant perspectives could include "airplanes", "flight logs", "passengers", etc. Depending on the comparable object, data may be retrieved from one domain or multiple domains, and from one or more perspectives within each domain.

Utilizing comparison weights in the retrieval of analogous object data has the technical effect of reducing computing processing power by focusing the retrieval and any associated searching of records to a limited selection of analogous objects. Objects that fail to match values for highly weighted attribute categories may be removed from the search and retrieval process, allowing for computer processing resources to be applied elsewhere.

At 228, method 200 includes outputting a comparative valuation for the object based on at least the associated attribute values for the comparable object, the associated analogous attribute values for each analogous object, the valuation of each analogous object, and the received comparison weights.

The received comparison weights may increase or decrease the extent of how much importance the characteristic has when making an attribute association comparison.

First, the comparison weights inform the query as to which attribute categories to evaluate. Using the attributes collected from the first step, the attributes of the comparable object are than compared to attributes of analogous objects.

FIG. 5 shows an example table depicting an attribute association comparison, wherein a comparable object 510 having a plurality of attributes 515 is compared to plurality of analogous objects 520. Plurality of attributes 515 includes both attribute categories 522 and associated attribute values 524. Attribute Association uses the attributes of objects to perform comparisons. Typically retrieved data follows a relational model, where key values connect tables together. Attribute Association makes use of these values as object types. Each object is an instantiation of an object type. For this domain, "airplane" serves as the object type, whereas an object would be an instantiation of a particular commercial airliner.

When a category and value of the comparable object match the category and value of an analogous object, that comparison counts towards the overall comparison of the two objects. The comparison weights applied to each attribute contribute to determining which analogous objects are most similar to the comparable object. The results from this comparison may be balanced towards the weights which had the strongest associations, not necessarily the strongest weights. The comparison may sum these matches to calculate which objects are most alike.

For each analogous object 520, a similarity score 530 for a specific object 532 may be output to the comparable object 510 based on at least the associated attribute values 524 for the comparable object 510, the retrieved analogous object data, and the comparison weights, including comparison radii where applicable. The example results consist of an ordered list of analogous objects which closely resemble the comparable object 510, siting the matching attributes 540 of each in order of relevance, and placing the most similar asset in the list first.

Once analogous objects have been identified, a comparative valuation for the comparable object may be determined based on at least a combined average of the valuations of two or more analogous objects. The comparative valuation for each object may be based on at least a weighted combined average of the valuations of two or more analogous objects using weights based on the similarity scores for each analogous object.

FIG. 6 shows an example interface 600 for determining a comparative valuation 605 for an object 610. A list of analogous objects 620 which share common attributes 630 with object 610. Each analogous object is coupled with a similarity score 635 and a valuation 640. Comparative valuation 605 may be determined using a combined average 645, a weighted average 650, or any other suitable method.

Returning to FIG. 2, at 230 method 200 includes outputting a comparative valuation for the asset based on the comparative valuations for each object of the asset. For example, the valuation for each comparable object of the asset may be summed together to determine a valuation for the asset. The summation may be weighted, for example, based on similarity scores, such that objects receiving high similarity scores are provided more weight than objects with low similarity scores. In some examples, the comparative valuation for the asset includes a range of values based on ranges of values for one or more objects of the asset. As an example, the comparative valuation for the object may be based on matching associated attribute values for attribute categories of the comparable object to associated analogous attribute values for attribute categories of each analogous object.

By changing the category weights of the comparable object, users may alter the resulting averages and thereby influence the valuation. As an example, method 200 may optionally include receiving a first set of comparison weights for at least some of the attribute categories; retrieving, based at least in part on the first received set of comparison weights, a first set of analogous object data for a first set of analogous objects that are each analogous to the comparable object, the first set of analogous object data including: two or more analogous attributes that are each analogous to one of the attributes of the comparable object, each analogous attribute defined by an analogous attribute category and an associated analogous attribute value, and a valuation of each analogous object. Method 200 may further include outputting a first comparative valuation for the object based on at least the associated attribute values for the comparable object, the first set of associated analogous object data, the valuation of each analogous object, and the first received set of comparison weights.

The first set of comparison weights may be generated by the user or by a computing system. The first set of comparison weights may be determined based on pre-set search conditions, by previous search conditions, predetermined preferences, machine learning, etc.

The methods may further include receiving a second set of comparison weights for at least some of the attribute categories, retrieving, based at least in part on the second received set of comparison weights, a second set of analogous object data for a second set of analogous objects that are each analogous to the comparable object, the second set of analogous object data including: two or more analogous attributes that are each analogous to one of the attributes of the comparable object, each analogous attribute defined by an analogous attribute category and an associated analogous attribute value, and a valuation of each analogous object. The method may further include outputting a second comparative valuation for the object based on at least the associated attribute values for the comparable object, the second set of associated analogous object data, the valuation of each analogous object, and the second set of comparison weights.

As per the first set of comparison weights, the second set of comparison weights may be user-generated of computer-generated or some combination thereof. The adaptability of the comparison weights may let users influence the valuation by allowing them the ability to overrule computer-derived defaults.

In some examples, the first set of analogous object data and the second set of analogous object data may be the same, but the first comparative valuation may be different from the second comparative valuation. In other words, as the comparison weights change, the results of the comparison may change, even if the set of analogous object data probed does not change.

In some examples, the first comparative valuation may be based on at least a first combined average of the valuations of two or more analogous objects from the first set of analogous objects, and the second comparative valuation may be based on at least a second combined average of the valuations of two or more analogous objects from the second set of analogous objects.

Figure 7:
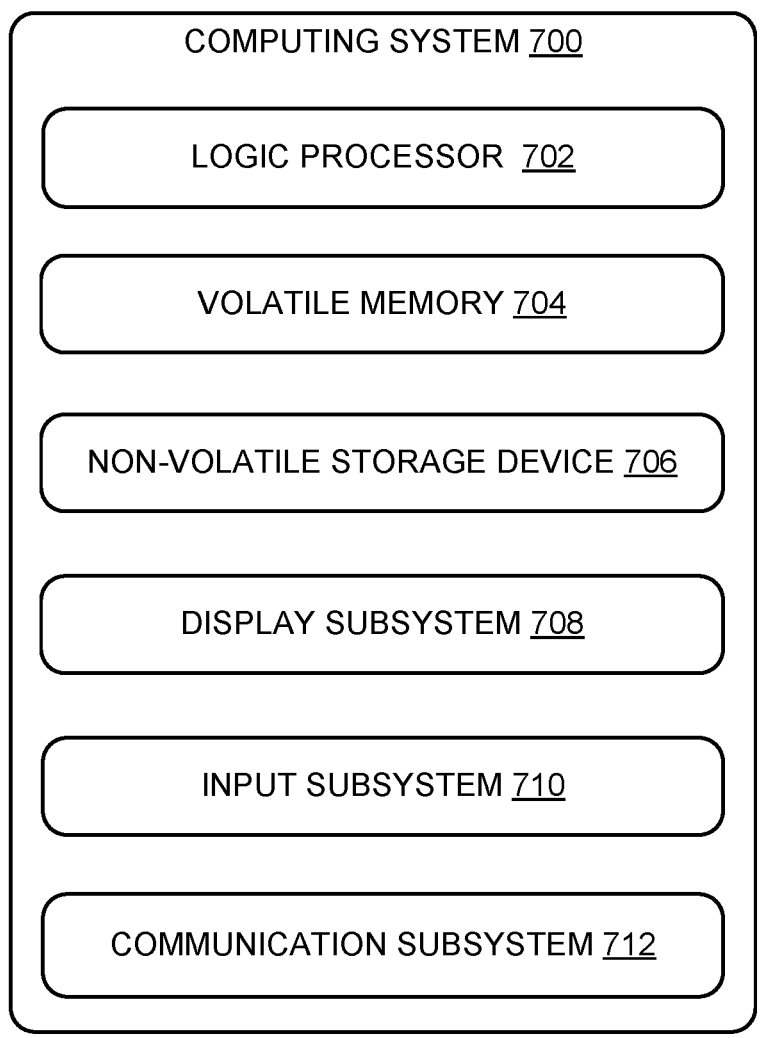
FIG. 7 shows a schematic view of an example computing environment in which the computing system of FIG. 1 may be enacted.

FIG. 7 schematically shows a non-limiting embodiment of a computing system 700 that can enact one or more of the methods and processes described above. Computing system 700 is shown in simplified form. Computing system 700 may embody the computing device 125 described above and illustrated in FIG. 1. Computing system 700 may take the form of one or more personal computers, server computers, tablet computers, home-entertainment computers, network computing devices, gaming devices, mobile computing devices, mobile communication devices (e.g., smartphone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally, or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 706 may be transformed—e.g., to hold different data.

Non-volatile storage device 706 may include physical devices that are removable and/or built-in. Non-volatile storage device 706 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "process" may be used to describe an aspect of computing system 700 typically implemented in software by one or more processors to perform a particular function using portions of volatile memory, which function involves transformative processing that specially configures the processor to perform the function. Thus, a process may be instantiated via logic processor 702 executing instructions held by non-volatile storage device 706, using portions of volatile memory 704. It will be understood that different processes may be instantiated from the same application, service, code block, object, library, routine, API, function, etc. Likewise, the same processes may be instantiated by different applications, services, code blocks, objects, routines, APIs, functions, etc. The term "process" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for determining a comparative valuation for an asset including one or more objects, the method comprising:
   automatically retrieving specification data for the asset from one or more storage devices;
   for each object of the asset:
   generating a comparable object based on the retrieved specification data, the comparable object including two or more attributes, each attribute defined by an attribute category and an associated attribute value;
   receiving comparison weights for one or more of the attribute categories;
   automatically retrieving, from one or more networked storage devices, based at least in part on the received comparison weights, analogous object data for a plurality of analogous objects that are each analogous to the comparable object, the analogous object data for each analogous object including:
   two or more analogous attributes that are each analogous to one of the attributes of the comparable object, each analogous attribute defined by an analogous attribute category and an associated analogous attribute value, and a valuation of the analogous object;

for each analogous object, outputting a similarity score to the comparable object based on at least the associated attribute values for the comparable object, the retrieved analogous object data, and the comparison weights; and outputting a comparative valuation for the object based on at least the associated attribute values for the comparable object, the associated analogous attribute values for each analogous object, the valuation of each analogous object, the received comparison weights, and a weighted combined average of the valuations of two or more analogous objects using weights based on the similarity scores for each analogous object; and outputting the comparative valuation for the asset based on the comparative valuations for each object of the asset.

2. The method of claim 1, wherein the specification data for the asset includes structured specification data and unstructured specification data, and wherein generating the comparable object includes extracting two or more attributes from unstructured specification data.

3. The method of claim 1, wherein the comparative valuation for the object is based on matching associated attribute values for attribute categories of the comparable object to associated analogous attribute values for attribute categories of each analogous object.

4. The method of claim 1, wherein the associated attribute values include both quantifiable attribute values and non-quantifiable attribute values.

5. The method of claim 4, wherein the comparison weights for attribute categories having quantifiable attribute values include one or more radii of attribute values.

6. A computing device configured to determine a comparative valuation for an asset including one or more objects, the computing device comprising:

a logic processor; and a non-volatile storage device configured with instructions that, when executed, cause the logic processor to:

automatically retrieve specification data for the asset, the specification data including structured specification data and unstructured specification data;

for each object of the asset:

extract two or more attributes from the unstructured specification data by parsing text based passages to identify associated attribute values;

generate a comparable object based on the retrieved specification data, the comparable object including at least the two or more attributes extracted from the unstructured specification data, each attribute defined by an attribute category and an associated attribute value;

receive comparison weights for at least some of the attribute categories;

automatically retrieve, from one or more networked storage devices, based at least in part on the received comparison weights, analogous object data for a plurality of analogous objects that are each analogous to the comparable object, the analogous object data for each analogous object including:

one or more analogous attributes that are analogous to one of the attributes of the comparable object, each analogous attribute defined by an analogous attribute category and an associated analogous attribute value, and a valuation of the analogous object; and output a comparative valuation for the object based on at least the associated attribute values for the comparable object, the associated analogous attribute values for each analogous object, the valuation of each analogous object, and the received comparison weights; and output the comparative valuation for the asset based on the comparative valuations for each object of the asset.

7. The computing device of claim 6, wherein the non-volatile storage device is further configured with instructions that, when executed, cause the logic processor to:

for each analogous object, output a similarity score to the comparable object based on at least the associated attribute values for the comparable object, the retrieved analogous object data, and the comparison weights.

8. The computing device of claim 7, wherein the comparative valuation for each object is based on at least a combined average of the valuations of two or more analogous objects.

9. The computing device of claim 7, wherein the comparative valuation for each object is based on at least a weighted combined average of the valuations of two or more analogous objects using weights based on the similarity scores for each analogous object.

10. The computing device of claim 6, wherein the associated attribute values include both quantifiable attribute values and non-quantifiable attribute values.

11. The computing device of claim 10 wherein the comparison weights for attribute categories having quantifiable attribute values include one or more radii of attribute values.

12. A method for determining a comparative valuation for an object, the method comprising:

automatically retrieving specification data for the object from one or more storage devices;

generating a comparable object based on the retrieved specification data, the comparable object including two or more attributes, each attribute defined by an attribute category and an associated attribute value;

receiving a first set of comparison weights for at least some of the attribute categories;

automatically retrieving, from one or more networked storage devices, based at least in part on the first received set of comparison weights, a first set of analogous object data for a first set of analogous objects that are each analogous to the comparable object, the first set of analogous object data including:

two or more analogous attributes that are each analogous to one of the attributes of the comparable object, each analogous attribute defined by an analogous attribute category and an associated analogous attribute value, and a valuation of each analogous object; and outputting a first comparative valuation for the object based on at least the associated attribute values for the comparable object, the first set of associated analogous object data, the valuation of each analogous object, and the first received set of comparison weights;

receiving a second set of comparison weights for at least some of the attribute categories; and outputting a second comparative valuation for the object based on at least the associated attribute values for the comparable object, the first set of associated analogous object data, the valuation of each analogous object, and the second set of comparison weights, the second comparative valuation for the object being different from the first comparative valuation for the object.

13. The method of claim 12, wherein the comparison weights for attributes having quantifiable attribute values include one or more radii of attribute values.

14. The method of claim 12, wherein the first comparative valuation for the object is based on at least a first combined average of the valuations of two or more analogous objects from the first set of analogous objects, and the second comparative valuation for the object is based on at least a second combined average of the valuations of two or more analogous objects from the first set of analogous objects.

* * * * *

UNITED STATES PATENT AND TRADEMARK OFFICE
CERTIFICATE OF CORRECTION

| | |
|---|---|
| PATENT NO. | : 11,507,610 B2 |
| APPLICATION NO. | : 16/681532 |
| DATED | : November 22, 2022 |
| INVENTOR(S) | : John Desmond Whelan |

It is certified that error appears in the above-identified patent and that said Letters Patent is hereby corrected as shown below:

In the Specification

Column 10,
Lines 5-6, please replace "user-generated of computer-generated" with --user-generated or computer generated--

Signed and Sealed this
Seventeenth Day of January, 2023

*Katherine Kelly Vidal*

Katherine Kelly Vidal
*Director of the United States Patent and Trademark Office*